United States Patent
Pope, Jr. et al.

(10) Patent No.: US 6,559,437 B1
(45) Date of Patent: May 6, 2003

(54) FIBER OPTIC DAMAGE SENSOR FOR WIRE AND CABLE

(76) Inventors: Ralph E. Pope, Jr., 3680 Ryans Bluff, Cumming, GA (US) 30040; Kenneth S. Watkins, Jr., 372 River Dr., Dahlonega, GA (US) 30533; Shelby J. Morris, Jr., 35 Curle Rd., Hampton, VA (US) 23669

( * ) Notice: Subject to any disclaimer, the term of this patent is extended or adjusted under 35 U.S.C. 154(b) by 207 days.

(21) Appl. No.: 09/665,828

(22) Filed: Sep. 20, 2000

(51) Int. Cl.$^7$ .................................................. G01J 1/04
(52) U.S. Cl. .................................... 250/227.14; 356/32
(58) Field of Search .................... 250/227.14, 227.15, 250/227.16; 356/32, 35; 340/540, 541, 555–557

(56) References Cited

U.S. PATENT DOCUMENTS

| | | | |
|---|---|---|---|
| 4,488,040 A | 12/1984 | Rowe | 250/227 |
| 4,581,527 A | 4/1986 | Crane et al. | 250/227 |
| 4,654,520 A * | 3/1987 | Griffiths | 250/227.14 |
| 5,841,617 A | 11/1998 | Watkins, Jr. et al. | 361/106 |

* cited by examiner

Primary Examiner—Que T. Le
(74) Attorney, Agent, or Firm—William B. Noll

(57) ABSTRACT

An optical fiber sensor, disposed in the insulation of a wire or cable, provides a means of detecting damage to the insulation of the wire or cable. An optical measurement device, such as an optical time domain reflectometer (OTDR), coupled to the sensor, detects the presence and location of a sensor fault or stress. The sensor is positioned between the conductor and the outside surface of the conductor so that the OTDR will sense damage before the conductor is exposed or contacted by a damage element.

11 Claims, 5 Drawing Sheets

FIBER OPTIC DAMAGE SENSOR FOR WIRE AND CABLE

FIELD OF THE INVENTION

This invention is directed to the field of fault detectors, more particularly to a fault detector system incorporating a fiber optic fault detection mechanism to alert a user thereof to potential problems, such as mechanical damage or overheating conditions to the electrical conductors or powered devices.

BACKGROUND OF THE INVENTION

The present invention relates to a mechanical fault detector system where fiber optics represent the fault detecting mechanism for the system. Fiber optics, as a signal transmission medium, is a recent innovation compared to electrical and other types of conductors. Fiber optics offer distinct advantages to the more conventional route as one can use a single filament or bundle a series of fiber optic filaments in a single cable, transmission losses are significantly reduced, and internal heat generation is not a problem.

A fiber optic system operates by the use of a laser to produce a light beam, a modulator which modulates the light beam before it is fired along the glass or fiber optic cable, to finally a light detector and amplifier.

While a fiber optic system offers distinct advantages over a convention electrical conductor system, there are limitations which must be noted. There are, for example, minimum bend radius requirements for fiber optic cables. For fiber optic cables not in tension, the minimum bend radius is 10×diameter; cables loaded in tension may not be bent at less than 20×diameter.

As an alternative to the traditional glass optic fibers, a recent development is a plastic fiber optic. However, with such alternative, there may be temperature limitations which must be considered. An optimum temperature range may be −30 to +70 degrees C. Operating outside the range may cause embrittlement of the plastic, or transmission loss and fiber shrinkage. Notwithstanding such limitations, considerable benefits may be gained through the use of fiber optic signal transmission systems.

A primary object of this invention is to detect mechanical or potential mechanical damage to an electrical conductor system or equipment, by the use of a fiber optic fault detector mechanism. The prior art offers different types of temperature or damage alerting devices for electrical conductor systems.

Historically, electrical apparatus have depended on overcurrent devices such as circuit breakers and fuses to protect the apparatus from over temperature conditions which might lead to equipment damage or personnel injury resulting from fire or smoke. Overcurrent devices suffer from limitations in their effectiveness, in that over temperature conditions can result from normal current flow through equipment suffering from damaged conductors or poor electrical connections. For example, an electrical cord containing stranded wire conductors may overheat if some of the strands are broken, even if less than rated current flows through the cord. Many fires have been caused due to poor connections in plugs, receptacles, and connection strips in cords and appliances.

Ground fault interrupters (GFI) are another common safety device used in electrical equipment. While such devices are effective in reducing electrical shock and equipment damage to shorts to ground, they are ineffective in cases where the fault does not result in current flow to ground. For example, a GFI will not prevent a fire in the case of broken conductor strands or poor connections because no ground current flow occurs. Neither GIF's nor over current devices protect a cord or device from over temperature conditions resulting from external sources of heat such as excessive ambient temperature conditions or contact with hot burners, hot piping, etc. Neither device may be effective if the cord is unable to dissipate normal heat. For example, the cord or appliance may become covered with thermally insulating material that prevents dissipation of heat due to normal current flow.

Temperature sensors such as resistance temperature sensors (Rtes) and thermistors are commonly used to detect over temperature conditions in equipment. These devices may be used to initiate alarms or relays to interrupt current to the device upon over temperature. While these devices are effective in sensing temperature in a small or enclosed space, they are ineffective in sensing over temperature over a long distance or in a large volume unless many devices are employed. Use of sufficient devices for sensing temperature over a long distance or large volume raises the cost of protection substantially. Also, the wiring needed for connecting a large number of sensors complicates the device and increases the size and bulk of the device.

U.S. Pat. No. 5,841,617 represents one significant approach to an alternative for a fault detection device for a conventional electrical conductor system. The patent teaches an electrical safety device comprising a sensor strip disposed in the insulation of an electrical power cord or other electrical apparatus. The sensor strip is made of a conductive polymer with a positive temperature coefficient of resistivity which increases with temperature. The sensor strip forms a series connected loop connected to an impedance measuring circuit. A relay interrupts current to the conductors of the cord when the impedance of the sensor strip increases due to an over temperature condition. The sensor strip is positioned between the conductors of the cord and the outside surface of the cord. The position of the sensor strip allows the strip to act as a mechanical damage sensor, opening the series connected loop before an energized conductor is exposed.

One proposal offered in the prior art, and directed to a fiber optic sensor, is taught in U.S. Pat. No. 4,488,040. The patent is directed to a fiber optic sensor useful in intrusion detection systems for sensing seismic or pressure disturbances provided by an intruder. The invention, thereof comprises a cable having an optical fiber core for transmitting the output of a laser, a hard electrically nonconductive strand wound helically on and coextensive with the fiber, and a compliant tubular sleeve over the fiber and strand. The coils of the strand are axially spaced apart and circumferentially engage the fiber. The sleeve fits snugly over the strand and fiber and transmits through the strand coils to the fiber forces resulting from disturbances to be detected, subjecting the fiber to bending stresses. With cable connected at one end to the laser output, the polarization of light transmitted by the fiber is changed by the induced stresses and is detected at the other end of the cable to indicate the occurrence of the disturbance.

Neither of the above prior art patents offers the answers to providing a fault detection system utilizing a fiber optic fault detecting mechanism. The manner by which the present invention provides such answers will become apparent, particularly to those persons skilled in the art, from the following description.

SUMMARY OF THE INVENTION

The present invention is directed to a fault detection system incorporating a fiber optic fault detecting mechanism to protect an electrical conductor, where the fault may be mechanical damage to the insulation. More particularly, the invention is directed to apparatus for detecting mechanical damage in a wire or cable by disposing an optical fiber sensor between an energized electrical conductor in the cable and the outside surface of the wire or cable. Mechanical damage, such as fraying, cutting or abrasion, will damage or sever the fiber optical fiber sensor before the electrical conductor is exposed or contacted. An optical signal measuring device, such as an optical time domain reflectometer (OTDR), coupled to the optical fiber sensor by an optical coupler, detects the defect in the optical fiber sensor caused by mechanical damage and provides an alarm or control action. The OTDR will also indicate the location of the damage to speed analysis and repair.

Accordingly, an object of this invention is to provide a fault detection system utilizing a fiber optic fault detecting mechanism to protect an electrical conductor, where the fault to be detected will be manifested by cutting or severing the fiber optic sensor, excessive pressure on the fiber optic sensor, or unduly high temperatures.

Another object hereof is the provision of plural fault sensing fiber optic elements to quickly determine the nature of the fault.

These and other objects of the invention will become apparent to those skilled in the art from the following specification, particularly when read in conjunction with the accompanying drawings.

BRIEF DESCRIPTION OF DRAWINGS

FIG. 7 is a perspective drawing of a optical fiber sensor attached to a wrapping tape wrapped around a bundle of insulated conductors.

FIG. 7A is a detailed perspective drawing of an optical connector attached on one end of the wrapping tape having an optical fiber sensor.

DETAILED DESCRIPTION OF PREFERRED EMBODIMENTS

Figure 1:
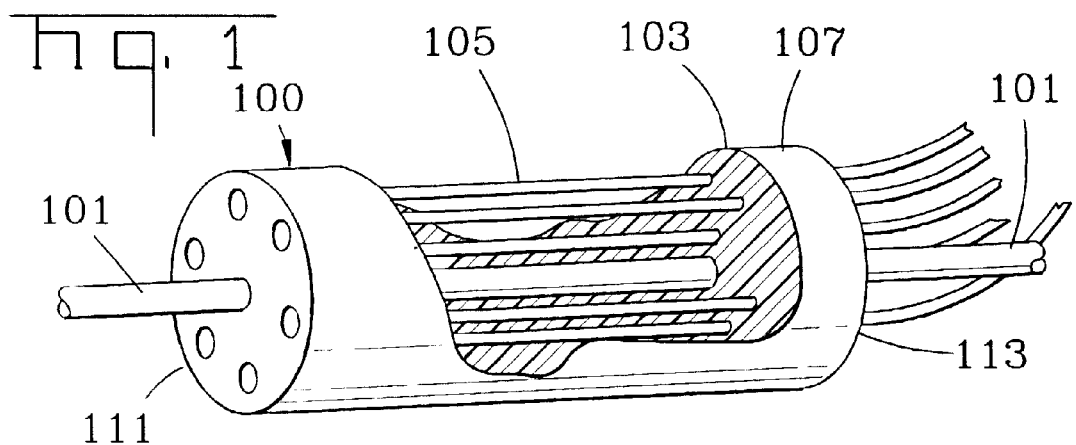
FIG. 1 is a partial perspective view, with parts removed, of a fiber optic fault detection mechanism incorporated into the cable insulation surrounding a centrally disposed electrical conductor.
Figure 2:
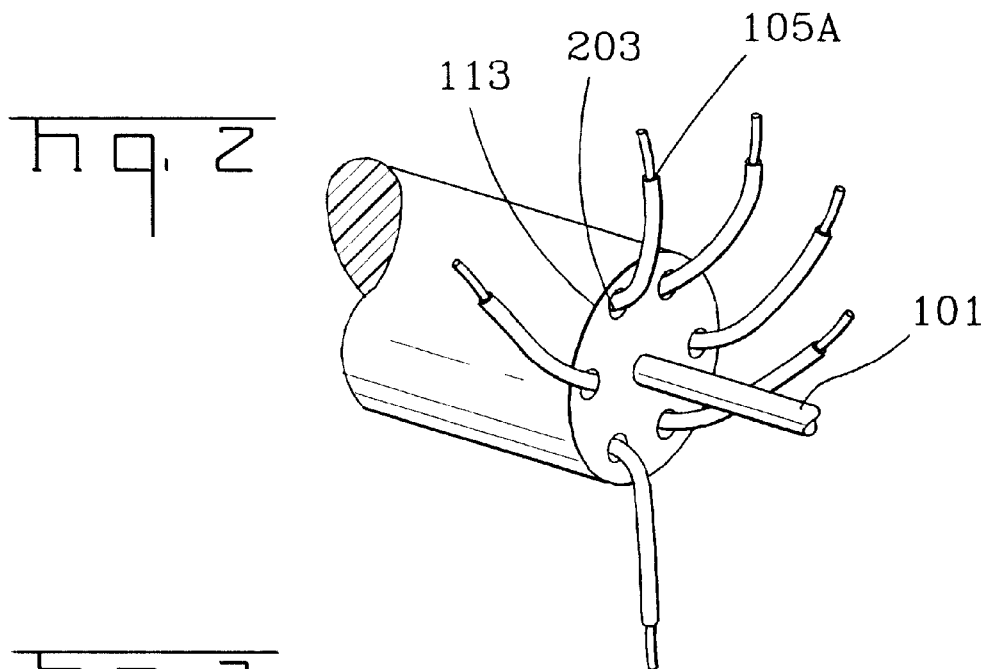
FIG. 2 is a perspective end view of the fault detection mechanism illustrated in FIG. 1.

The present invention is directed to a mechanical fault detection system incorporating a fiber optic fault detecting mechanism within an insulated electrical cable to provide protection to the cable assembly and associated equipment. The invention will now be described with regard to the several Figures, where like reference numerals represent like components or features throughout the various views. Turning now to the embodiment of FIGS. 1 and 2, FIG. 1 is a partial cutaway perspective drawing of a fault sensing assembly wire 100 comprising an electrical conductor 101 surrounded by insulation 103. Conductor 101 may be any electrical conductor used to conduct electrical current, either direct current, alternating current, or pulsed current. In the preferred embodiment, conductor 101 is a metallic conductor, either solid, stranded or braided. In other embodiments, conductor 101 may be a conductive polymer. Insulation 103 is an insulator material having a high d.c. resistance and good dielectric strength. In the preferred embodiment, insulation 103 may be an elastomer, thermoplastic or thermosetting plastic. In the preferred embodiment, insulation 103 is applied by extrusion in a die when conductor 101 is passed through the die.

Fiber optic sensors or filaments 105 are disposed in insulation 103 between conductor 101 and outside surface 107, where attention will have to be given to the positioning thereof while avoiding excessive bends in the filaments, as noted above. Preferably, the fiber optic filaments 105 are spaced radially about conductor 101 with the longitudinal axis of said filaments generally parallel to the longitudinal axis of conductor 101. In the preferred embodiment, a sufficient quantity of filaments 105 are spaced radially about conductor 101 so that mechanical damage such as cutting or fraying of a relatively small portion of insulation 103 between outside surface 107 and conductor 101 will result in damage to, or pressure on, the filament strip 105 to provide a detectable fault to an optical signal measuring device before external contact is made with conductor 101.

A plurality of fiber optic filaments 105 are preferred to perform a practical mechanical damage sensing function. For example, a single filament would detect mechanical damage from only a single radial or angular portion of the wire insulation. Multiple filaments would detect mechanical damage of multiple radial portions of the wire cross-section. The intent of the filaments is to detect if the insulation becomes cracked or separated, if an exterior object cuts, frays, or abrades the wire insulation before the external object contacts the conductor, or if excessive pressure or stress is applied to the insulated conductor.

Fiber optic filaments 105 extend beyond end 113 to allow optical connectors (not shown) for connection to an optical measurement device. Fiber optic filaments 105 may be cut or other wise terminated at end 111. Fiber optic filaments 105 may be individual fibers, clad, or they may be jacketed 105A as indicated in the figure.

FIG. 2 is an end view of the insulated conductor of FIG. 1 showing fiber optic filaments 105 extending from end 113.

A supporting compound, such as a melt-adhesive 203 may be used to provide support for the filament where it exits end 113.

Figure 3:
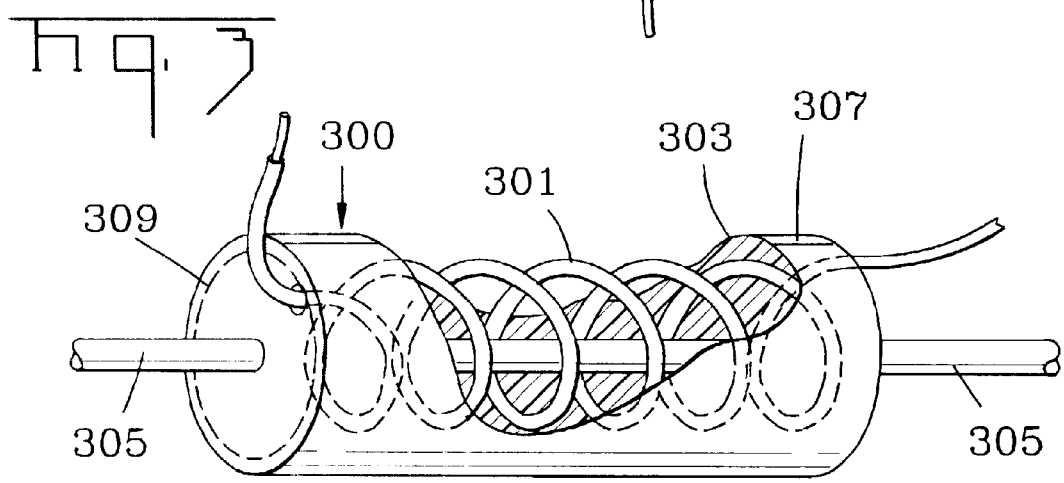
FIG. 3 is a partial perspective view, with parts removed, of an alternate embodiment for the fault detection mechanism of this invention.

FIG. 3 is an alternate embodiment of a fault sensing assembly 300 protected by a fiber optic filament 301. The filament 301 is disposed in a helical relationship within the insulation 303 about single conductor 305 of assembly 300. Positioned in this manner, mechanical abrasion, cutting or fraying of outside surface 307 of the assembly 300 will result in breaking or damaging the filament 301 before conductor 305 is exposed. Assembly 300 may be made by first forming an insulated wire with an outer diameter shown by 309. Fiber optic filament 301 is wrapped over diameter 309 in the helical pattern and the insulated conductor is jacketed to enclose the fiber optic filament 102. Other embodiments substitute multiple insulated conductors for conductors 101 of FIG. 1 and 305 of FIG. 3.

Figure 4:
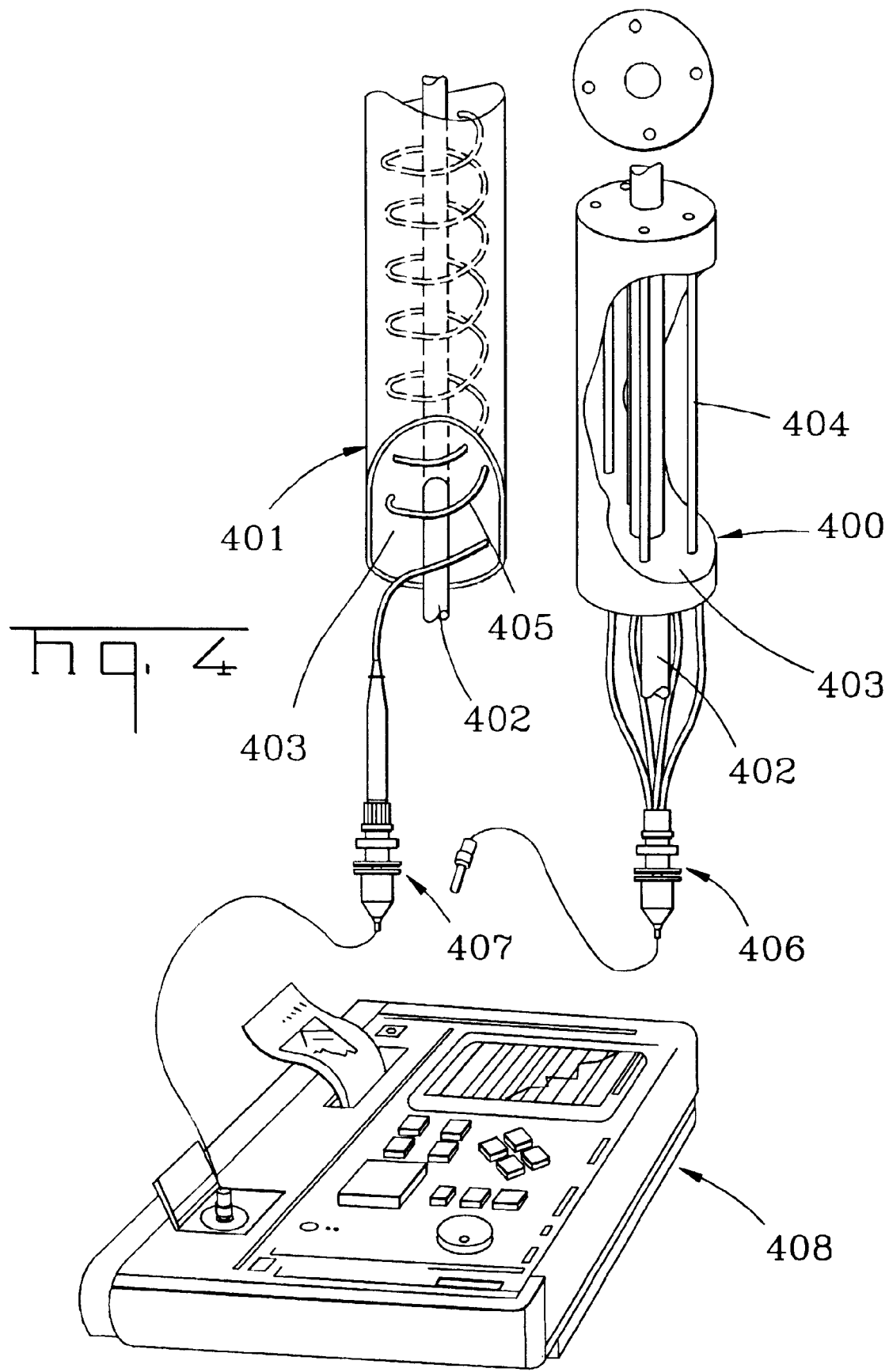
FIG. 4 is a perspective view, with some components enlarged to illustrate details of the components, showing an optical time domain reflectometer (OTDR) coupled to one of two alternate optical fiber sensors (enlarged) via fiber optic connectors, according to preferred embodiments of this invention.

FIG. 4 shows a preferred configuration for using the fault detecting system of this invention. The preferred configuration comprises an insulated conductor 400 or 401, where each features a central electrical conductor 402 surrounded by insulation 403, as known in the art. Conductor 402 may also be a group of conductors, a shielded cable, a multi-conductor cable, or an optical fiber link. The first sensor device 400 shows multiple fiber optic sensors 404 arrayed generally parallel to one another within the insulation 403. The alternate sensor device 401 shows a single fiber optic sensor 405 helically wound, and within the insulation 403, about the conductor or cable 402. In either case, the fiber optic sensor essentially provides protection to the conductor throughout 360 degrees.

To identify and alert the user of a real or potential fault, the configuration includes a fiber optic connector as shown in the figure. The first said connector 406 is a screw type connector offering heavy duty service. The alternate connector 407, preferably intended for light duty service, may consist of a bayonet-type connector, as known in the art. In either case, the fiber optic sensor device 400, 401 is connected via the fiber optic connector 406, 407, respectively, to an optical time-domain reflectometer (OTDR) 408, as known in the art, which provides a convenient readout to the user to quickly identify the location of the real or potential damage.

Figure 5:
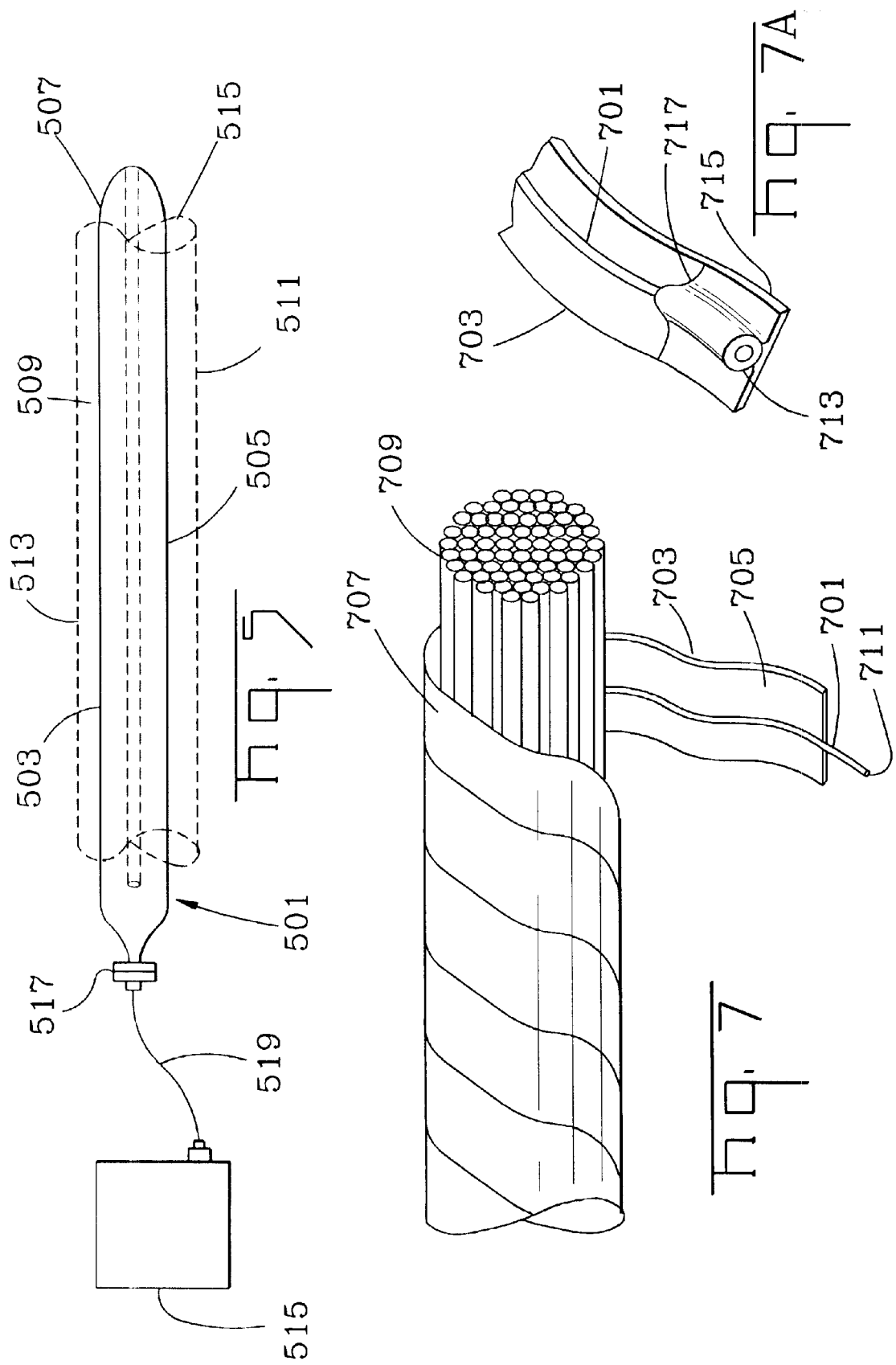
FIG. 5 is a schematic diagram of an embodiment of the present invention incorporating a continuous loop optical fiber sensor, the sensor connected to an optical measurement device having an optical transmitter and optical receiver coupled to the two ends of the sensor loop.

FIG. 5 is a schematic diagram of an alternative embodiment employing a fiber optic sensor loop 501. Sensor loop 501 comprises at least one fiber optic source portion 503 connected to at least one fiber optic return portion 505 by a return shunt portion 507. Sensor loop 501 is disposed in insulation 509 of insulated conductor 511 between outside surface 513 and conductor 515 as described earlier.

Fiber optic sensor loop 501 allows connection of the sensor to an optical measurement device 515 such as an optical power meter from one end of insulated conductor 511. Optical measurement device 515 employs a separate optical transmitter and receiver connected to optical coupling 517 by cable 519. In a preferred embodiment, fiber optic sensor loop 501 comprises four or more longitudinal sensor portions spaced radially about conductor 511 and connected by shunt portions to form a single series-connected loop. The actual number of sensor strips is selected so that insulation damage from a specified source and direction will result in opening or sufficient damage to an optical sensor portion to be detected by the optical receiver of measurement device 515.

Sensor portions 503 and 505 of FIG. 5 may be helical sensor portions such as 301 of FIG. 3, or longitudinal sensor portions such as 105 of FIG. 1. The sensor portions may be spaced axially or radially in the insulation and connected by shunt portions to provide loops connectable at one end of the insulated conductor.

Figure 6:
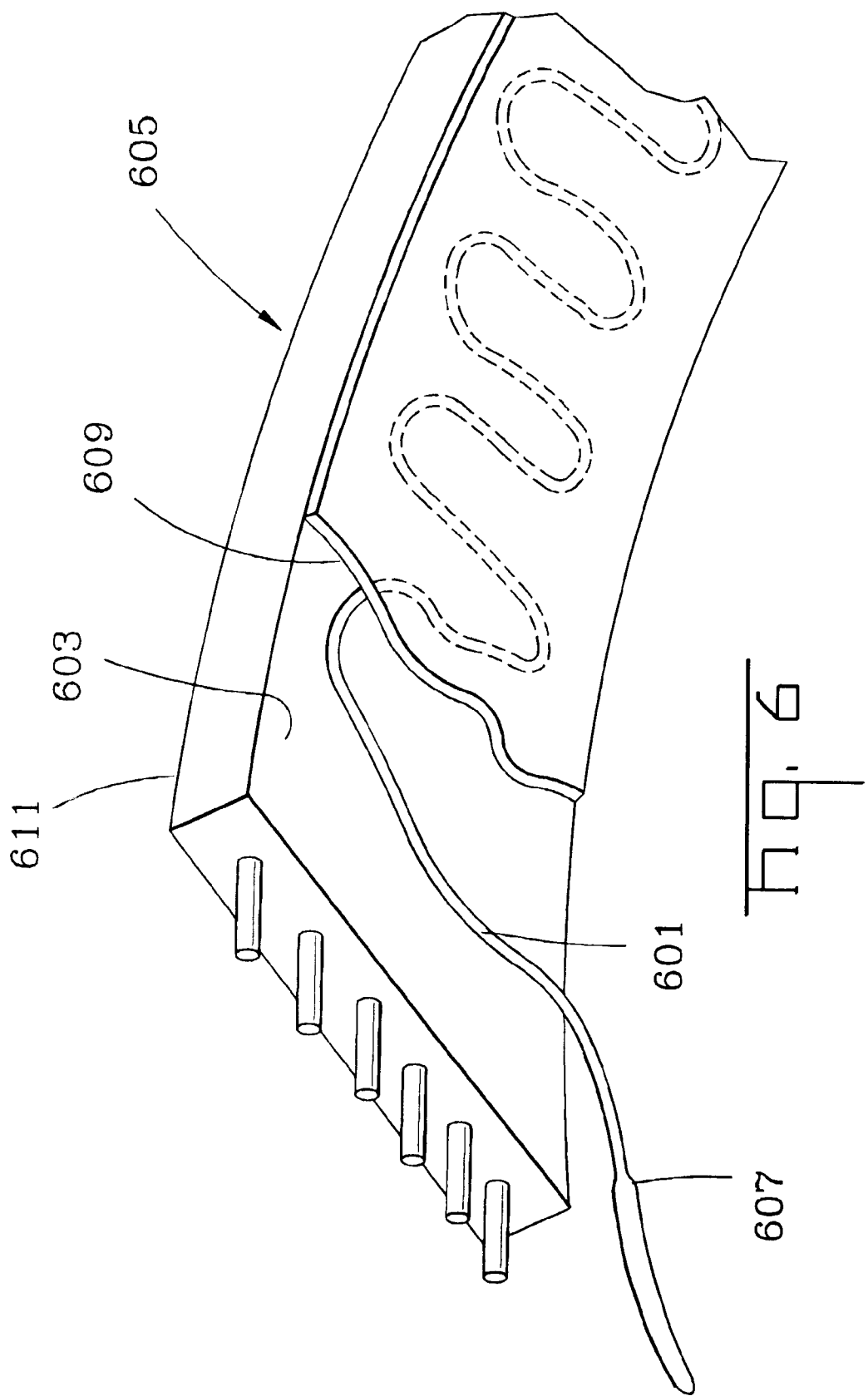
FIG. 6 is a perspective drawing of a ribbon cable comprising an optical fiber mechanical damage sensor on the bottom flat surface of the cable.

FIG. 6 shows a fiber optic sensor 601 attached to the bottom surface 603 of ribbon cable 605. Sensor 601 may be disposed in a "sinusoidal" pattern as shown in the figure, or alternatively, sensor 601 may be disposed as several separate or interconnected longitudinal sensor portions similar to that described earlier. In one embodiment, sensor 601 may transition to a jacketed fiber optic cable at 607. In other embodiments, sensor 601 may be connected to an optical coupling fixed to ribbon conductor 605. In the preferred embodiments, a protective strip 609, attached to bottom surface 603 provides protection for normal handling and operation for optic sensor 601. Protective strip 609 may be attached by adhesives, welding, or extrusion. In still other embodiments, additional fiber optic sensors are disposed on other surfaces of ribbon cable 605, such as top surface 611.

FIG. 7 is a perspective drawing of an optical fiber sensor 701 disposed on a protective wrapping tape 703. Sensor 701 may be attached to a surface 705 of tape 703 by adhesives, an adhesive strip, or, alternatively, embedded in the tape, for example during extrusion. In a preferred embodiment, surface 705 of tape 703 comprises an adhesive which adheres to the outside surface 707 to allow adhesion of successive wrappings of tape 703 when wrapped about a bundle of conductors 709. In the preferred embodiments, the adhesive also adheres to the outside surface of conductor bundle 709. End 711 of optic fiber sensor 701 may transition to a fiber optic cable for connection to a measurement device as discussed in previous embodiments. In still other embodiments, sensor 701 may be disposed in a sinusoidal or other pattern on tape 703 to increase coverage of the sensor. Also, several optical fiber sensors may be disposed on the tape, for example in parallel.

FIG. 7A is a perspective detail of an optical connector or coupler 713 connected to sensor 701 and attached to end 715 of tape 703. Fixing of coupler 713 to tape 703 improves security of coupling sensor 701 to a measurement device and reduces likelihood of sensor/coupling breakage. Adhesive tape 717 fixes coupler 713 to tape end 715. In other embodiments, adhesives, welding, or mechanical fasteners provide attachment of coupler 713 to tape 703.

Tape 703 may be wrapped around, or otherwise attached to other components such as electrical equipment boxes, casings, motor frames, appliance cases and other components and equipment for which security or mechanical/thermal damage protection is desired.

Figure 8:
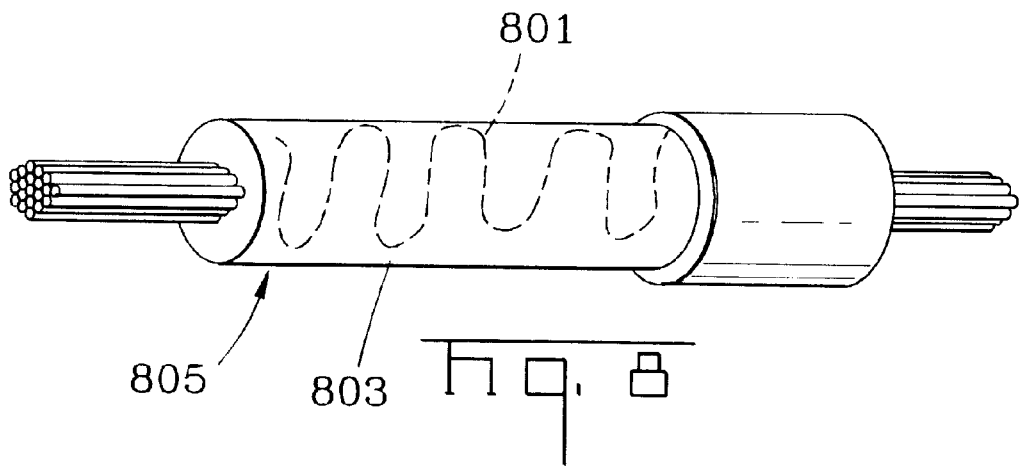
FIG. 8 is a perspective drawing of a fiber optic sensor disposed in a sinusoidal pattern in the insulation portion of an insulated conductor.

Still another optical fiber damage sensor is shown in FIG. 8. Optical fiber sensor 801 is disposed in a sinusoidal pattern in insulation 803 of insulated conductor 805. The outside portion 807 of insulation 803 is removed from part of the insulated conductor to show sensor 801. One or more sensors 801 may be fixed to an intermediate insulated diameter of the conductor and a protective jacket extruded, shrunk, wrapped or otherwise formed over the sensor. Patterns other than sinusoidal, such as sawtooth patterns may be used.

Mechanical damage in an electrical wire, cable or conduit may be defined as a permanent and/or irreversible change or deformation in the wire, cable or conduit which if not detected, could with continued or prolonged exposure result in an electrical malfunction. Several types of mechanical damage which could occur and are protectable by the present invention are discussed in the following paragraphs.

Figure 9:
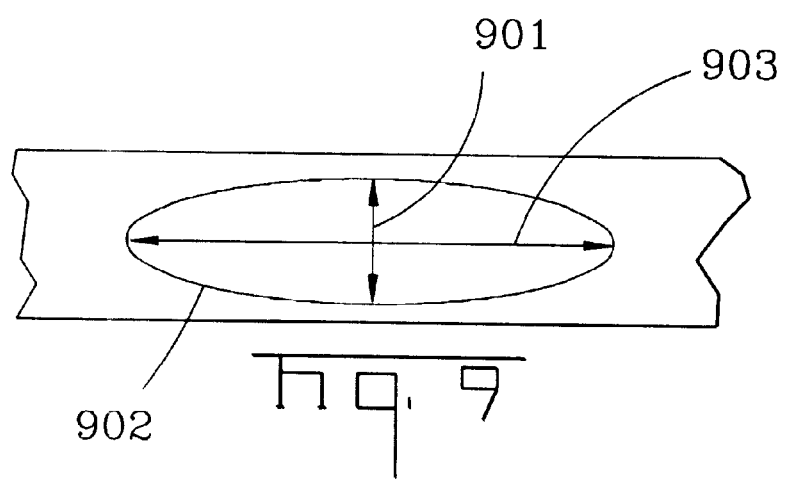
FIG. 9 is a detail drawing of the surface-damaged portion of an insulated conductor, the damage caused by abrasion or scraping.

Surface damage to the insulated conductors may be caused by abrasion or scraping, as shown in FIG. 9. Such damage 902 is characterized by a minor surface dimension 901 of less than one diameter of the insulated conductor, and a major surface dimension 903 of greater than 1 diameter of the insulated conductor. In many instances of surface abrasion, major surface dimension 903 may be greater than 5 or ten times the diameter of the insulated conductor.

For helically wrapped sensors, such as those of FIG. 3 and FIG. 7, surface damage protection is a partly a function of the effective diameter of the conductor. This is because larger diameter conductors typically have a larger wall thickness, allowing a higher pitch distance and still provide adequate assurance that the sensor will be damaged or cut before the conductor is exposed. Other factors, such as the size and shape of the abrasive or scraping surface or objects is also a factor.

In the preferred embodiments of helically wrapped sensors, the pitch is less than 10 times the effective diameter of the insulated conductor. The effective diameter is defined as 1.128 times the square root of the cross-sectional area of the insulated conductor. In the more preferred embodiments, the pitch is less than 5 times the effective diameter. In the most preferred embodiments, the pitch is less than the effective diameter of the insulated conductor.

In longitudinally disposed sensors such as those of FIGS. 1 and 2, the number of sensors selected to provide adequate protection from surface damage depends on the size and shape of the expected abrading or scraping surface, the insulation wall thickness and the amount of insulation damage which may be tolerated. At least three longitudinal sensors or strips are positioned radially about the conductor of the insulated conductor to provide reasonable assurance that the sensors will be damaged or cut before exposing the conductor. In the preferred embodiments, at least four sensors are utilized to provide better protection from 360 degree radial directions, and for smaller size damage initiators. In the most preferred embodiments, at least six longitudinal sensors are spaced uniformly about a radial pattern.

Figure 10:
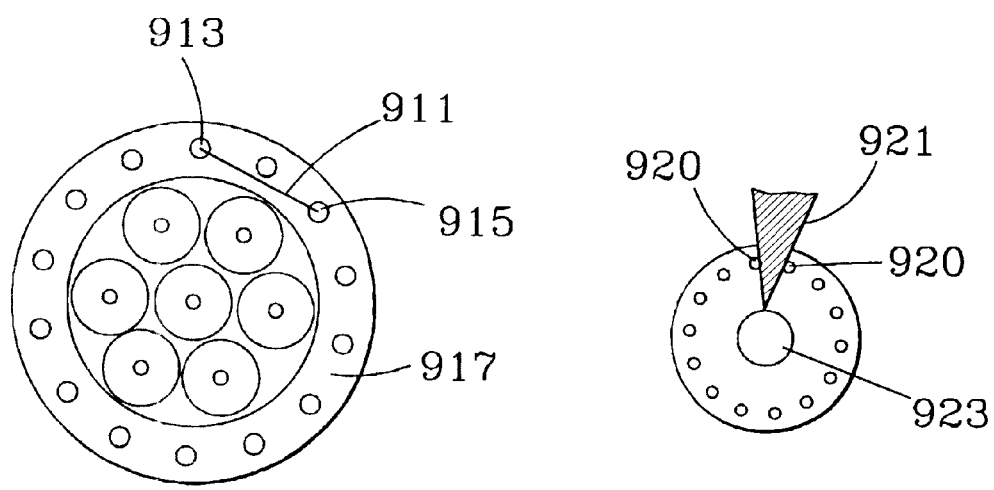
FIG. 10 is a cross-section of a conduit of the present invention showing a plurality of optical fiber sensors disposed longitudinally in the conduit wall, and a straight line connecting adjacent sensors inside of the inner diameter of the conduit.

For thin walled applications, such as the conduit of FIG. 10, sufficient sensors are employed and space so that a chord line 911 between adjacent sensors 913 and 915 is not inside of the inner diameter 917 of the conduit. In the case of insulated conductors, the chord line between adjacent sensors should not contact the conductor. The same method is useful in non-circular cross-sections.

For patterned longitudinal sensors, such as those of FIG. 8, sufficient sensors are utilized such that, in the preferred embodiment, any chord drawn from two points on the outer diameter intersect and therefore damage the sensor before the conductor is exposed.

Figure 11:
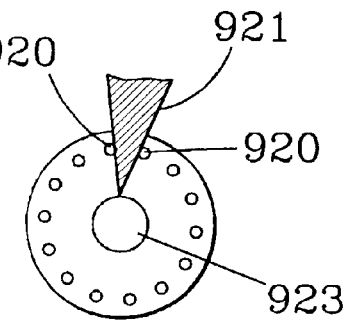
FIG. 11 is a cross-section drawing of the fiber optic sensors of the present invention providing cutting/penetration damage sensing of an insulated conductor.

The sensors of the present invention may also provide protection from cutting or penetration. This type of damage may be caused by cutting action of blades, sharp edges of supporting structures, or penetration of pointed objects. For cutting or penetration protection in the preferred embodiments, sensor spacing is selected to insure that a sensor is damaged or cut before the cutting or penetrating object contacts the conductor. In other words, the sensor 920 spacing should be less than the cross-sectional dimension of the penetrating or cutting object 921 before the object contacts the conductor 923, as shown in FIG. 11.

Damage to wire, cable and conduits may also be caused by fatigue, especially in conjunction of insulation embrittlement from aging or chemical deterioration. This damage is often evidenced by insulation cracking, leading to increased probability of shorts and ground paths. This form of sensor placement for surface and/or cutting and penetration damage will typically be sufficient to provide protection from these faults.

Actual cutting of the fiber optic sensor is not required for damage sensing. Optical signal analysis, such as that provided by an OTDR, may indicate the presence and location of slight faults in the optical fiber sensor. Deformations such as microbending caused by mechanical or thermal stress on the sensor may also be detected. Insulation cracking due to chemical or thermal aging may be detectable by the resulting changes in localized fiber stress. Stresses resulting from differential thermal expansion of the sensor optical fiber and a jacket, or other insulated conductor components may be detectable as temperature variations of interest. In this manner, the optical fiber sensor may also perform as an overtemperature sensor as well as a mechanical damage sensor.

It is recognized that changes, variations, and modifications can be made in the arrangement of components of the fault detector mechanism of this invention without departing from the spirit and scope thereof. For example, the fiber optic sensor may provide protection for another fiber optic cable. Or, a fiber optic sensor may be disposed in a wire or cable jacket or conduit, etc. Accordingly, no limitation is intended to be imposed hereon except as set forth in the appending claims.

What is claimed is:

1. An insulated conductor for sensing insulation damage comprising;

an insulated portion surrounding an elongated conductor portion; and a plurality of helical windings of an optical sensor comprising an optical fiber disposed in the insulation portion and surrounding the elongated conductor portion between the conductor portion and an outside surface of the insulation portion, the plurality of helical windings comprising a predetermined pitch whereby mechanical damage to a sub-portion of the insulation portion results in sufficient stress on at least one of said plurality of helical windings to be detectable by an optical measurement device connectable to said optical sensor.

2. The insulated conductor according to claim 1, wherein the insulated conductor comprises a cross-sectional area and an effective diameter defined as 1.128 times the square root of the cross-sectional area of the insulated conductor and said predetermined pitch is less than ten times the effective diameter.

3. The insulated conductor according to claim 1, wherein the insulated conductor comprises a cross-sectional area and an effective diameter defined as 1.128 times the square root of the cross-sectional area of the insulated conductor and said predetermined pitch is less than five times the effective diameter.

4. The insulated conductor according to claim 1, wherein the insulated conductor comprises a cross-sectional area and an effective diameter defined as 1.128 times the square root of the cross-sectional area of the insulated conductor and said predetermined pitch is less than the effective diameter.

5. The insulated conductor according to claim 1, wherein the optical sensor comprises an optical connector on a first end of the sensor.

6. An insulated conductor for sensing insulation damage comprising:

an insulated portion surrounding an elongated conductor portion; and a predetermined number of longitudinal optical sensor portions, each of said predetermined number of longitudinal sensor portions comprising an optical fiber and disposed in the insulation portion generally parallel to the conductor portion, and spaced between the conductor portion and an outside surface of the insulation portion in a predetermined cross-sectional pattern surrounding the elongated conductor portion; the predetermined number of longitudinal optical sensor portions being at least two and a number sufficient whereby mechanical damage to a sub-portion of the insulation portion results in sufficient stress on at least one of said predetermined number of longitudinal optical sensor portions to be detectable by an optical measurement device connectable to said predetermined number of longitudinal optical sensor portions.

7. The insulated conductor according to claim 6, wherein the predetermined number of longitudinal optical sensor portions is at least three.

8. The insulated conductor according to claim 6, wherein the predetermined number of longitudinal optical sensor portions is at least four.

9. The insulated conductor according to claim 6, wherein the insulated conductor comprises a generally circular cross-section, the predetermined number of longitudinal optical sensor portions is at least three, and the predetermined cross-sectional pattern is generally equidistant angular spacing about the conductor portion.

10. The insulated conductor according to claim 6, wherein at least one of said predetermined number of optical sensor portions comprises an optical connector on a first end of the sensor portion.

11. The insulated conductor according to claim 6, wherein said predetermined number of longitudinal optical sensor portions are connected to form a series-connected loop.

* * * * *